(12) United States Patent
Vickers

(10) Patent No.: US 10,688,592 B1
(45) Date of Patent: Jun. 23, 2020

(54) FRICTION STIR WELDING OF ALUMINUM ALLOYS

(71) Applicant: United Launch Alliance, L.L.C., Englewood, CO (US)

(72) Inventor: Brian D. Vickers, Parker, CO (US)

(73) Assignee: United Launch Alliance L.L.C, Centennial, CO (US)

( * ) Notice: Subject to any disclaimer, the term of this patent is extended or adjusted under 35 U.S.C. 154(b) by 0 days.

(21) Appl. No.: 15/696,006

(22) Filed: Sep. 5, 2017

(51) Int. Cl.
*B23K 20/12* (2006.01)

(52) U.S. Cl.
CPC .......... *B23K 20/128* (2013.01); *B23K 20/122* (2013.01)

(58) Field of Classification Search
CPC ................. B23K 20/122–128; B23K 2103/10
USPC ...................................... 228/112.1, 2.1, 262.5
See application file for complete search history.

(56) References Cited

U.S. PATENT DOCUMENTS

| | | | | |
|---|---|---|---|---|
| 3,857,165 A * | 12/1974 | Vernam | ................. | B23K 35/286 148/523 |
| 4,078,712 A * | 3/1978 | Cook | .................... | B23K 20/028 228/170 |
| 4,732,312 A * | 3/1988 | Kennedy | ................. | B23K 20/24 148/535 |
| 5,971,252 A * | 10/1999 | Rosen | ................. | B23K 20/1265 228/112.1 |
| 6,045,028 A * | 4/2000 | Martin | .................. | B23K 20/122 228/112.1 |
| 6,173,880 B1 * | 1/2001 | Ding | ....................... | B23K 20/12 156/73.5 |
| 6,328,261 B1 * | 12/2001 | Wollaston | ............ | B23K 20/122 228/112.1 |
| 6,530,513 B2 * | 3/2003 | Ezumi | ................ | B23K 20/1245 228/112.1 |
| 6,543,671 B2 | 4/2003 | Hatten et al. | | |

(Continued)

FOREIGN PATENT DOCUMENTS

| | | | | |
|---|---|---|---|---|
| CA | 2921220 A1 * | 2/2015 | ........... | B23K 20/124 |
| GB | 2552343 A * | 1/2018 | ................ | B64F 5/00 |

(Continued)

OTHER PUBLICATIONS

Frank Armao, "Aluminum workshop: why isn't 7075 weldable?", The Welder (Jul./Aug. 2018), available at https://www.thefabricator.com/article/aluminumwelding/aluminum-workshop-why-isn-t-7075-weldable-.*

(Continued)

*Primary Examiner* — Kiley S Stoner
(74) *Attorney, Agent, or Firm* — Sheridan Ross P.C.

(57) ABSTRACT

The present invention is directed to friction stir welding, and in particular to apparatuses, methods, and systems using friction stir welding to join one or more components comprising an aluminum 2xxx alloy with one or more components comprising an aluminum 7xxx alloy. The aluminum 2xxx alloy may be in the form of a filler insert, for example a sheet or strip, between two larger aluminum 7xxx alloy components, or the aluminum 2xxx alloy may be in the form of a larger component welded directly to an aluminum 7xxx alloy component of comparable size. Weldments according to the present invention have improved resistance to stress corrosion cracking without the need for post-weld artificial aging and are useful in many applications, for example in construction of spacecraft parts.

16 Claims, 4 Drawing Sheets

(56) References Cited

U.S. PATENT DOCUMENTS

| | | | |
|---|---|---|---|
| 6,676,004 B1* | 1/2004 | Trapp | B23K 20/1255 228/112.1 |
| 6,997,369 B2 | 2/2006 | Hamada et al. | |
| 7,121,448 B2 | 10/2006 | Subramanian et al. | |
| 7,762,447 B2* | 7/2010 | Feng | B23K 20/1225 228/112.1 |
| 7,866,532 B1 | 1/2011 | Potter et al. | |
| 7,905,383 B1 | 3/2011 | Torng et al. | |
| 7,918,379 B2 | 4/2011 | Fujii et al. | |
| 8,061,579 B2 | 11/2011 | Feng et al. | |
| 8,123,104 B1 | 2/2012 | Potter et al. | |
| 8,132,708 B1 | 3/2012 | Potter et al. | |
| 8,141,764 B1 | 3/2012 | Potter et al. | |
| 8,827,139 B2 | 9/2014 | Obaditch et al. | |
| 8,960,523 B2 | 2/2015 | Szymanski et al. | |
| 9,010,613 B1* | 4/2015 | Matlack | B23K 20/1225 228/112.1 |
| 9,511,445 B2 | 12/2016 | Kandasamy | |
| 2002/0092888 A1* | 7/2002 | Ezumi | B23K 20/1245 228/112.1 |
| 2003/0024965 A1* | 2/2003 | Okamura | B23K 20/122 228/112.1 |
| 2003/0042292 A1* | 3/2003 | Hatten | B23K 20/1255 228/112.1 |
| 2003/0075584 A1* | 4/2003 | Sarik | B23K 20/122 228/2.1 |
| 2003/0116609 A1* | 6/2003 | Dracup | B23K 20/1255 228/112.1 |
| 2003/0192941 A1* | 10/2003 | Ishida | B23K 20/123 228/112.1 |
| 2003/0226935 A1* | 12/2003 | Garratt | B21B 1/08 244/123.7 |
| 2004/0050907 A1* | 3/2004 | Dracup | B23K 20/1255 228/112.1 |
| 2004/0056075 A1* | 3/2004 | Gheorghe | B23K 20/122 228/199 |
| 2005/0011932 A1* | 1/2005 | Ehrstrom | B23K 20/122 228/112.1 |
| 2005/0011933 A1* | 1/2005 | Grong | B21C 23/005 228/165 |
| 2005/0217770 A1* | 10/2005 | Lequeu | C22C 21/10 148/698 |
| 2006/0043151 A1* | 3/2006 | Stol | B23K 20/1255 228/2.1 |
| 2006/0043152 A1* | 3/2006 | Stol | B23K 20/1255 228/2.1 |
| 2006/0054666 A1* | 3/2006 | Ehrstrom | B23K 20/122 228/227 |
| 2006/0065694 A1* | 3/2006 | Stol | B23K 20/1255 228/2.1 |
| 2006/0108394 A1* | 5/2006 | Okaniwa | B23K 20/122 228/101 |
| 2007/0128463 A1* | 6/2007 | Dixon | B21C 23/08 428/654 |
| 2007/0138236 A1 | 6/2007 | Agarwal et al. | |
| 2007/0138239 A1* | 6/2007 | Kumagai | B23K 20/1235 228/227 |
| 2007/0246137 A1* | 10/2007 | Lequeu | C22C 21/12 148/693 |
| 2008/0047222 A1 | 2/2008 | Barnes | |
| 2008/0099534 A1 | 5/2008 | Brice et al. | |
| 2008/0217377 A1* | 9/2008 | Stol | B23K 20/1255 228/2.3 |
| 2009/0068492 A1* | 3/2009 | Fujii | B23K 9/173 428/615 |
| 2009/0148719 A1* | 6/2009 | Bergstrom | B23K 20/122 428/595 |
| 2009/0188109 A1* | 7/2009 | Bampton | B23K 20/1225 29/890.01 |
| 2009/0230173 A1* | 9/2009 | Stol | B23K 20/125 228/112.1 |
| 2009/0324991 A1* | 12/2009 | Bordesoules | B23K 20/122 428/650 |
| 2010/0001133 A1* | 1/2010 | Kempa | B23K 9/173 244/118.6 |
| 2010/0019084 A1* | 1/2010 | Sisk | B64F 5/00 244/1 R |
| 2010/0129683 A1* | 5/2010 | Lin | B23K 9/23 428/654 |
| 2010/0279146 A1* | 11/2010 | Rowe | B23K 20/1255 428/650 |
| 2012/0024433 A1 | 2/2012 | Yanar et al. | |
| 2012/0090738 A1* | 4/2012 | Hales | C21D 9/50 148/535 |
| 2015/0072170 A1 | 3/2015 | Lin et al. | |
| 2015/0132181 A1 | 5/2015 | Anderson et al. | |
| 2016/0030992 A1* | 2/2016 | Clarke | B21D 22/022 148/535 |
| 2016/0151855 A1* | 6/2016 | Fukuda | B23K 20/124 228/114.5 |
| 2017/0130752 A1* | 5/2017 | Zhang | B23K 35/286 |
| 2017/0232547 A1* | 8/2017 | Chai | B23K 35/286 219/86.22 |
| 2018/0111217 A1* | 4/2018 | Chai | B23K 11/115 |
| 2018/0112298 A1* | 4/2018 | Weykamp | C22F 1/053 |
| 2018/0185968 A1* | 7/2018 | Grong | B23K 35/28 |
| 2018/0214991 A1* | 8/2018 | Yahata | B23K 35/284 |
| 2018/0243860 A1* | 8/2018 | Misak | B23K 20/2333 |

FOREIGN PATENT DOCUMENTS

| | | | | |
|---|---|---|---|---|
| JP | 3919682 | | 5/2007 | |
| WO | WO-2010060021 A1 | * | 5/2010 | B23K 9/23 |
| WO | WO 2016/180985 A1 | * | 11/2016 | |

OTHER PUBLICATIONS

Jay Deinken, Rockwell Science Center "Friction Stir Welding": Jul. 20, 1999.*

"Additive Friction Stir," Aeroprobe, 2017, 2 pages [retrieved online from: http://www.aeroprobe.com/additivefrictionstir/].

"Additive Friction Stir Deposition of Aluminum Alloys and Functionally Graded Structures Project," Space Technology Mission Directorate, Apr. 2015, 3 pages.

Godiganur et al. "Comparison of Friction Stirs Welding Technique with Conventional Welding Methods," International Journal of Research in Engineering and Technology, May 2014, vol. 3, Special Issue 3, pp. 572-576.

Lee et al. "The joint properties of copper by friction stir welding," Materials Letters, 2004, vol. 58, pp. 1041-1046.

Puleo "Additive Friction Stir Manufacturing of 7055 Aluminum Alloy," University of New Orleans, 2016, Senior Honors Theses, 57 pages.

Salih et al. "A review of friction stir welding of aluminium matrix composites," Materials and Design, vol. 86, Dec. 2015, pp. 61-71.

Threadgill et al. "Friction stir welding of aluminium alloys," International Materials Reviews, 2009, vol. 52, No. 2, pp. 39-49, [retrieved online from: https://www.twi-global.com/technical-knowledge/published-papers/friction-stir-welding-of-aluminium-alloys/] 55 pages.

Widener et al. "Evaluation of Post-Weld Heat Treatments to Restore the Corrosion Resistance of Friction Stir Welded Aluminum Alloy 7075-T73 vs. 7075-T6," THERMEC '06, Session G4: Friction Stir Processing, Jul. 2006, 25 pages.

* cited by examiner

FRICTION STIR WELDING OF ALUMINUM ALLOYS

FIELD OF THE INVENTION

This invention relates to friction stir welding, and in particular to apparatuses, methods, and systems using friction stir welding to join one or more components comprising an aluminum 2xxx alloy with one or more components comprising an aluminum 7xxx alloy.

BACKGROUND

The International Alloy Designation System naming scheme for wrought alloys utilizes a four-digit number ("xxxx") for categorizing aluminum alloys. The first digit indicates the major alloying elements, the second, if different from 0, indicates a variation of the alloy, and the third and fourth digits identify the specific alloy in the series. For example, in alloy 7075, the first digit ("7") indicates the alloy is in the zinc series and the third and fourth digits indicate a specific alloy used in aerospace applications. As used herein, a single number followed by three letters x, i.e., "7xxx", means all of the alloys within a specific series. Thus, 7xxx means all 7000 series alloys, and 2xxx means all 2000 series alloys.

Large spacecraft components, such as propellant tanks, are most commonly constructed out of a combination of aluminum 2xxx and aluminum 7xxx alloys, especially including aluminum 7075 alloy. 7075 alloy is strong, lightweight, and readily available, and it has positive cryogenic properties that make it attractive for use in low-temperature environments. 7075 alloy is not fusion-weldable, however, and so construction of components made of 7075 alloy historically required the use of mechanical fasteners. More recently, however, solid-state welding techniques, such as friction stir welding, have been developed as alternative assembly processes.

Friction stir welding of aluminum alloys is considered a cost-saving process because it does not require consumable materials, and because most welds, even in very thick material, can be completed with only one or two passes. Friction stir welding is also highly energy-efficient, providing further cost savings. Typically, large cylindrical spacecraft propellant tanks constructed by friction stir welding consist of about five panels, joined along abutting edges to form a cylinder, with a ring and a dome joined at each end of the cylinder to form the closed, sealed tank. Such components can be friction stir-welded without multiple passes, inter-run cleaning, back gouging, or spatter; in many cases the welding can be done automatically without human intervention and can eliminate the need for post-weld dressing. Examples of friction stir welding used in the manufacture of space vehicles include U.S. Pat. Nos. 7,866,532, 8,123,104, 8,132,708 and 8,141,764, each of which is incorporated herein by reference in its entirety.

Despite these advantages, friction stir welding of aluminum 7xxx alloys presents challenges, particularly in applications such as spacecraft. Friction stir welds (FSWs) of aluminum 7xxx alloys are metallurgically unstable in their as-welded condition and are sensitive to stress corrosion cracking (SCC). Post-weld artificial aging (PWAA) can improve resistance to SCC, but adds significant time, processing, and operational costs to the construction process, and can degrade the mechanical performance of the parent material. In one example, it is recommended that PWAA heat treatments comprise 100 hours of heating at 225 degrees Fahrenheit or, alternatively, 325 degrees Fahrenheit for 4 hours. See, e.g., "Evaluation of Post-Weld Heat Treatments to Restore the Corrosion Resistance of Friction Stir Welded Aluminum Alloy 7075-T73 vs. 7075-T6," "Conclusions," by Christian Widener, Jul. 5, 2006 (THERMEC '06—Session G4: Friction Stir Processing). In addition, PWAA requires an oven that is large enough to receive the entire welded component or heater strips or blankets covering the weldments, all of which may be costly, difficult, or even impossible to obtain in the case of a very large component such as a spacecraft propellant tank.

There is thus a need in the art for apparatuses, methods, and systems that provide stable, stress corrosion cracking-resistant friction stir welds of aluminum 7xxx alloys, without the need for expensive and time-consuming post-weld artificial aging. It is further advantageous for such apparatuses, methods, and systems to provide improved heating and stirring functions.

SUMMARY

It is one aspect of the present invention to provide a method for joining two aluminum alloy components, comprising providing first and second components, each of the first and second components comprising an aluminum 7xxx alloy; providing a filler insert, comprising an aluminum 2xxx alloy; disposing the filler insert between, and in direct physical contact with, a weld edge of the first component and a weld edge of the second component; and friction stir welding along a weld region, the weld region comprising the entirety of a width of the filler insert and the weld edges of the first and second components.

In embodiments, at least one of the aluminum 7xxx alloys may be aluminum 7075 alloy.

In embodiments, the aluminum 2xxx alloy may be aluminum 2219 alloy.

In embodiments, each of the first and second components may be a component of a spacecraft propellant tank selected from the group consisting of a wall panel, a ring, and a dome.

In embodiments, the filler insert may be in the form of a linear sheet or strip. The width of the filler insert may be equal to about half of a width of the weld region.

In embodiments, the filler insert may have a trapezoidal cross-section.

In embodiments, the method may further comprise tack welding, by a process other than friction stir welding, a portion of the filler insert to a portion of at least one of the first and second components to hold the filler insert and the at least one of the first and second components in place during the friction stir welding step.

In embodiments, the friction stir welding step may consist essentially of a single pass with a friction stir welding tool.

In embodiments, the friction stir welding step may comprise at least two passes with a friction stir welding tool. A time interval between the first pass and the second pass may be at least about two weeks.

It is another aspect of the present invention to provide a method for joining two alloy components, comprising providing a first component, comprising an aluminum 7xxx alloy; providing a second component, comprising an aluminum 2xxx alloy; placing a weld edge of the first component proximate to a weld edge of the second component; and friction stir welding along a weld region, the weld region comprising the weld edges of the first and second component.

In embodiments, the aluminum 7xxx alloy may be aluminum 7075 alloy.

In embodiments, the aluminum 2xxx alloy may be aluminum 2219 alloy.

In embodiments, each of the first and second components may be a component of a spacecraft propellant tank selected from the group consisting of a wall panel, a ring, and a dome.

In embodiments, the method may further comprise tack welding, by a process other than friction stir welding, a portion of the first component to a portion of the second component to hold the first and second components in place during the friction stir welding step.

In embodiments, the friction stir welding step may consist essentially of a single pass with a friction stir welding tool.

In embodiments, the friction stir welding step may comprise at least two passes with a friction stir welding tool. A time interval between the first pass and the second pass may be at least about two weeks.

It is another aspect of the present invention to provide a method for constructing a spacecraft propellant tank, comprising (a) providing N wall panels, where N is an integer equal to or greater than one, each of the N wall panels comprising an aluminum 7xxx alloy; (b) providing N wall panel filler inserts, each of the N wall panel filler inserts comprising an aluminum 2xxx alloy; (c) disposing each of the N wall panel filler inserts between, and in direct physical contact with, panel weld edges of consecutive ones of the N wall panels or, when N equals 1, a first panel weld edge and a second panel weld edge of the wall panel; and (d) friction stir welding along each of N wall panel weld regions, each of the N wall panel weld regions comprising the entirety of a width of one of the N wall panel filler inserts and either the panel weld edges of consecutive ones of the N wall panels or, when N equals 1, the first and second panel weld edges of the wall panel, to form a cylinder.

In embodiments, the method may further comprise providing first and second domes, each of the first and second domes comprising an aluminum 7xxx alloy; providing first and second dome filler inserts, each of the first and second dome filler inserts comprising an aluminum 2xxx alloy; further disposing each of the first and second dome filler inserts at opposing ends of the cylinder, wherein the first dome filler insert is in direct physical contact with a first dome weld edge of the cylinder and a weld edge of the first dome to form a first dome weld region, and wherein the second dome filler insert is in direct physical contact with a second dome weld edge of the cylinder and a weld edge of the second dome to form a second dome weld region; and further friction stir welding along each of the first and second dome weld regions to form the spacecraft propellant tank. The method may further comprise providing a ring comprising an aluminum 7xxx alloy; and, between the further disposing step and the further friction stir welding step, providing a ring filler insert comprising an aluminum 2xxx alloy; disposing the ring filler insert at an end of the cylinder, wherein the ring filler insert is in direct physical contact with a cylinder weld edge of the ring and ring weld edges of all of the N wall panels to form a ring weld region; and friction stir welding along the ring weld region.

In embodiments, at least one of the aluminum 7xxx alloys may be aluminum 7075 alloy.

In embodiments, at least one of the aluminum 2xxx alloys may be aluminum 2219 alloy.

In embodiments, at least one of the filler inserts may be in the form of a linear sheet or strip.

In embodiments, at least one of the friction stir welding steps may consist essentially of a single pass with a friction stir welding tool.

In embodiments, at least one of the friction stir welding steps comprises at least two passes with a friction stir welding tool. A time interval between the first pass and the second pass may be at least about two weeks.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, explain the principles of these inventions.

Figure 1:
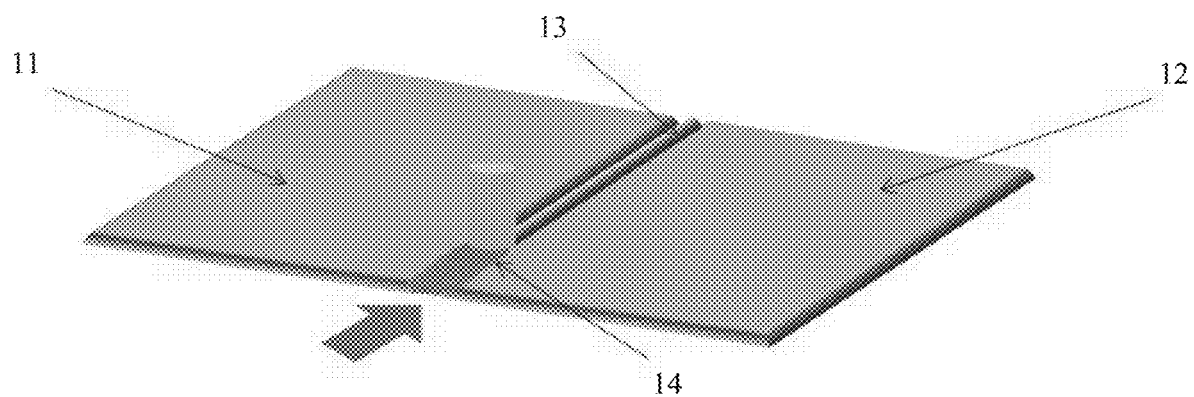
FIG. 1 is a schematic of a friction stir welding process, according to embodiments of the present invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION OF THE INVENTION

In embodiments of the present disclosure, apparatuses, systems, and methods utilize aluminum 2xxx alloys in friction stir welding (FSW) of aluminum 7xxx alloys. The aluminum 2xxx alloy may be provided in the form of a sheet, strip or filler of appropriate shape that is inserted between two aluminum 7xxx alloy components to be joined by FSW. Alternatively, in embodiments of the present disclosure, an aluminum 2xxx alloy component may be friction stir-welded directly to a single abutting aluminum 7xxx alloy component without a filler material between the components to be joined. The invention thus enables the joining of multiple 7xxx alloys or joining 7xxx alloy components to 2xxx alloy components using friction stir welding. Thus, and as a non-limiting example, large aluminum structures, especially structures constructed out of high-strength aluminum 7xxx alloys such as aluminum 7050 alloy and aluminum 7075 alloy as used in aerospace applications, may be joined. The aluminum structures are resistant to stress corrosion cracking (SCC) in the as-welded condition, without the need for post-weld artificial aging (PWAA) processes.

Without being bound by any particular theory, the present invention may function by any of several mechanisms, each of which arises from a difference in the compositions of aluminum 2xxx alloys as compared to aluminum 7xxx alloys. Specifically, aluminum 2xxx alloys comprise larger quantities of copper and much lower quantities of magnesium and zinc than aluminum 7xxx alloys; when an aluminum 7xxx alloy is friction stir-welded with an aluminum 2xxx alloy, additional copper is stirred into the aluminum 7xxx alloy and weld nugget regions. Copper is known to be more cathodic, i.e. corrosion resistant, than zinc, and so one explanation for the improved SCC resistance of aluminum 2xxx alloy/aluminum 7xxx alloy friction stir welds may be due to the electrochemical effect of additional copper in the aluminum 7xxx alloy regions. Further, an aluminum 2xxx alloy/aluminum 7xxx alloy friction stir weld requires less heat input during welding than friction stir welding of two aluminum 7xxx alloy components due to the lower strength of aluminum 2xxx alloys; an additional or alternative metallurgical mechanism for the functioning of the invention may be that the aluminum 7xxx alloy is thus subjected to less weld sensitization and precipitate dissolution. Still further, aluminum 2xxx alloy/aluminum 7xxx alloy friction stir welds may have lower internal mechanical stresses than friction stir welds between two aluminum 7xxx alloy components.

Embodiments of the present disclosure allow for the joining of items made primarily of aluminum 7xxx alloys, with interstitial areas joined together by aluminum 2xxx alloys using friction stir welding without post-weld artificial aging. Alternatively or additionally, a 7xxx alloy component may be joined directly to a 2xxx alloy component using the same process; in other words, the aluminum 2xxx alloy component need not be a narrow sheet, strip or filler material lying between two aluminum 7xxx alloy components, but may itself be a panel or structural component joined to an aluminum 7xxx alloy component. Aluminum 2xxx alloy filler may take any other shape or form suitable for a particular application, including, by way of non-limiting example, a filler portion cut from plate stock or from extrusion stock forms. Filler portions cut from plate or extrusion stock may be cut to any desired geometry.

When the aluminum 2xxx alloy is provided in the form of a sheet or strip that is inserted between two 7xxx alloy components as a filler material, the optimal width of the aluminum 2xxx alloy filler strip will depend on the width of the region to be affected by the friction stir weld, which may include a weld nugget and/or a thermo-mechanically affected zone (TMAZ), and/or on the desired copper content of the weld region. By way of non-limiting example, where a weld region having a width of about 0.5 inches and a copper content of about 4% are expected or desired, those of ordinary skill in the art may select an aluminum 2219 alloy strip having a width of about 0.25 inches. Those of ordinary skill in the art will understand how to select aluminum 2xxx alloy filler material components having an appropriate width for particular applications.

Although the use of essentially linear sheets or strips of the aluminum 2xxx alloy filler material is one application of embodiments of the present disclosure, other geometries for the aluminum 2xxx alloy filler material are contemplated. For example, where a non-linear weld pattern is desired, a sheet or strip of the aluminum 2xxx alloy material may be curved or arcuate, or may have any other desirable geometry; by way of non-limiting example, the aluminum 2xxx alloy material may have a trapezoidal cross-section where it is desirable for a weld region to be narrower at one vertical face of the weld and wider at an opposing vertical face of the weld. Aluminum 2xxx alloy components may also be used to "dovetail" two or more aluminum 7xxx alloy components where a desired geometry of the finished welded component is complex. Those of ordinary skill in the art will understand how to select aluminum 2xxx alloy filler material components having a suitable geometry for particular applications.

The apparatuses, methods, and systems disclosed herein that employ friction stir welding between at least one aluminum 2xxx alloy component and at least one aluminum 7xxx alloy component may be used in conjunction with any other previously known method for welding and/or constructing welded components. By way of non-limiting example, the at least one aluminum 2xxx alloy component and at least one aluminum 7xxx alloy component may be tack-welded by fusion welding in at least one location to hold the components in place while they are permanently joined by friction stir welding.

Referring now to FIG. 1, a schematic of a friction stir welding process according to the present invention is illustrated. In the embodiment illustrated in FIG. 1, corresponding edges of two plates 11,12 are separated by a narrow filler portion 13. The two plates 11,12 are made of an aluminum 7xxx alloy, while the filler portion 13 is made of an aluminum 2xxx alloy. The two plates 11,12 and filler portion 13 are then welded together by a friction stir welding tool 14. The width of the filler portion 13 is selected to be narrower than a weld region generated by the friction stir welding tool 14, such that in a single pass, the friction stir welding tool 14 passes over the entire width of the filler portion 13 and at least a portion of each of the plates 11,12.

It is to be understood that the scheme illustrated in FIG. 1 is not the only possible scheme encompassed by the present invention. By way of non-limiting example, one plate may be made of an aluminum 2xxx alloy, and this aluminum 2xxx alloy may be friction stir welded to an aluminum 7xxx alloy plate, without the use of a separate aluminum 2xxx alloy filler portion.

The following Examples illustrate some of the advantages and benefits of particular embodiments of the invention. Further advantages and benefits of these embodiments, and other embodiments, will be apparent to those of ordinary skill in the art based on the disclosure herein.

Example 1

Welding of Aluminum 7075-T7351 Plate to Aluminum 2219-T87 Plate

A plate made of aluminum 7075-T7351 alloy was friction stir welded to a plate of aluminum 2219-T87 alloy. The compositions of the aluminum 7075-T7351 alloy and the aluminum 2219-T87 alloy are presented in Table 1.

TABLE 1

Compositions of aluminum 7075-T7351 alloy and aluminum 2219-T87 alloy

| Element | Content in 7075-T7351 alloy (wt %) | Content in 2219-T87 alloy (wt %) |
|---|---|---|
| Silicon | 0-0.40 | 0-0.20 |
| Iron | 0-0.50 | 0-0.30 |
| Copper | 1.2-2.0 | 5.8-6.8 |
| Manganese | 0-0.30 | 0.20-0.40 |
| Magnesium | 2.1-2.9 | 0-0.02 |
| Chromium | 0.18-0.28 | not specified |
| Zinc | 5.1-6.1 | 0-0.10 |
| Titanium | 0-0.20 | 0.02-0.10 |
| Vanadium | not specified | 0.05-0.15 |
| Zirconium | not specified | 0.10-0.25 |
| Other elements, total | 0-0.15 | 0-0.15 |
| Aluminum | balance | balance |

The friction stir welding tool used to join the plates had a pin diameter of about 0.4 inches and a shoulder diameter of 1.0 inch. The weld schedule specified a 265 rpm spindle rotation, a 7.5 ipm travel rate, and a 7600 lb forge force. The friction stir weld was accomplished in a single pass.

Figure 2A:
FIG. 2A is an illustration of the macrostructure of a friction stir weldment between the plates and filler insert illustrated in FIG. 3, according to embodiments of the present invention.
Figure 2B:
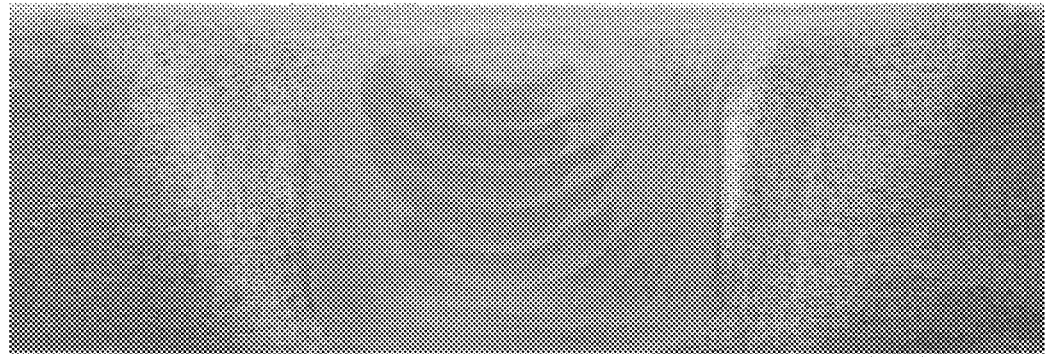
FIG. 2B is an illustration of the macrostructure of a friction stir weldment between an aluminum 7xxx alloy component and an aluminum 2xxx alloy component, according to embodiments of the present invention.

Referring now to FIG. 2A, the friction stir weldment is illustrated. An asymmetric macrostructure of the nugget between the two plates is observed as a partial "swirl" pattern in the weld nugget region. A friction stir weldment between two aluminum 7075 alloy plates with an aluminum 2219 alloy filler insert, welded according to the same procedure, is illustrated in FIG. 2B for comparison and has a similar, symmetric, nugget macrostructure, seen as the more complete, darker "swirl" pattern.

The same FSW process was used to join a plate of aluminum 7050 alloy to a plate of aluminum 7075 alloy, and to join two plates of aluminum 7075 alloy. Table 2, set forth below, compares stress corrosion cracking test data for twelve samples of the 7075/2219 welded item (specimen group A), twelve samples of the 7050/7075 welded item (specimen group B), and twelve samples of the 7075/7075 welded item (specimen group C). The SCC testing process was carried out according to ASTM G47, "Standard Test Method for Determining Susceptibility to Stress-Corrosion Cracking of 2XXX and 7XXX Aluminum Alloy Products." Test samples were exposed to an SCC environment utilizing an alternate immersion process in a 3.5% sodium chloride solution. In Table 2, "acceptable disposition" indicates that there was no SCC test failure for that specimen after a 30-day test duration in the SCC test chamber while under continuous sustained stress.

TABLE 2

Flat Tensile Stress Corrosion Cracking Test Matrix

| Specimen Group | Specimen | Sustained Test Stress (ksi) | Test Duration (Days) | Inspection Results |
|---|---|---|---|---|
| A | 1 | 26.25 | 30 | Acceptable Disposition |
|  | 2 | (75% weld | 30 | Acceptable Disposition |
|  | 3 | yield | 30 | Acceptable Disposition |
|  | 4 | strength) | 30 | Acceptable Disposition |
|  | 5 | 17.5 | 30 | Acceptable Disposition |
|  | 6 | (50% weld | 30 | Acceptable Disposition |
|  | 7 | yield | 30 | Acceptable Disposition |
|  | 8 | strength) | 30 | Acceptable Disposition |
|  | 9 | 8.75 | 30 | Acceptable Disposition |
|  | 10 | (25% weld | 30 | Acceptable Disposition |
|  | 11 | yield | 30 | Acceptable Disposition |
|  | 12 | strength) | 30 | Acceptable Disposition |
| B | 1 | 36 | 24 | Fracture observed at 24 days |
|  | 2 | (75% weld | 18 | Fracture observed at 18 days |
|  | 3 | yield | 6 | Fracture observed at 6 days |
|  | 4 | strength) | 12 | Fracture observed at 12 days |
|  | 5 | 24 | 30 | Acceptable Disposition |
|  | 6 | (50% weld | 11 | Fracture observed at 11 days |
|  | 7 | yield | 30 | Acceptable Disposition |
|  | 8 | strength) | 30 | Acceptable Disposition |
|  | 9 | 12 | 30 | Acceptable Disposition |
|  | 10 | (25% weld | 6 | Fracture observed at 6 days |
|  | 11 | yield | 24 | Fracture observed at 24 days |
|  | 12 | strength) | 30 | Fracture observed at 30 days |
| C | 1 | 36 | 6 | Fracture observed at 6 days |
|  | 2 | (75% weld | 6 | Fracture observed at 6 days |
|  | 3 | yield | 12 | Fracture observed at 12 days |
|  | 4 | strength) | 30 | Acceptable Disposition |
|  | 5 | 24 | 30 | Acceptable Disposition |
|  | 6 | (50% weld | 6 | Fracture observed at 6 days |
|  | 7 | yield | 30 | Acceptable Disposition |
|  | 8 | strength) | 30 | Acceptable Disposition |
|  | 9 | 12 | 30 | Acceptable Disposition |
|  | 10 | (25% weld | 30 | Acceptable Disposition |
|  | 11 | yield | 30 | Acceptable Disposition |
|  | 12 | strength) | 30 | Acceptable Disposition |

The test data show that all of the specimens of Specimen Group A (7075 alloy to 2219 alloy) passed the stress corrosion cracking tests, while many of the specimens of Specimen Groups B (7050 alloy to 7075 alloy) and C (7075 alloy to 7075 alloy) did not.

Example 2

SCC Properties of Aluminum 7075-T7351 Plates with Aluminum 2219-T87 Filler Two aluminum 7075-T7351 alloy plates were friction stir welded with an aluminum 2219-T87 alloy filler insert according to the weld schedule of Example 1; a width for the filler insert was selected to be 0.25 inches, i.e. narrower than the weld nugget and TMAZ created by the friction stir welding tool. Specimens were prepared and subjected to SCC testing according to ASTM G47, as well as tensile strength testing. Half of the specimens in the SCC test (AF1) were subjected to only a single pass of the friction stir welding tool, while the other half (AF2) were subjected to four passes with offset passes 0.150 inches from the weld centerline. For all specimens, surface conductivity and hardness were measured at the weld centerline, the bending stress direction in SCC testing was transverse across the weldment, and the SCC test was carried out in a 3.5% sodium chloride solution utilizing the alternate immersion process. Results of the tensile strength and SCC testing are presented in Tables 3 and 4, respectively. In Table 4, "YS" refers to yield strength and "acceptable disposition" indicates that there was no SCC failure after 30 days of exposure duration in the SCC test chamber while under continuous sustained stress.

TABLE 3

Tensile strength test results

| Specimen group | Conductivity (% IACS) | Hardness (HRB) | Ultimate tensile strength (ksi) | Yield strength (ksi) | Elongation (%) |
|---|---|---|---|---|---|
| AF1 (16 test samples) | 33.4 | 63 | 38.5 | 31.4 | 4.7 |
| AF2 (16 test samples) | 33.6 | 67 | 57.2 | 36.4 | 9.2 |

TABLE 4

SCC test results

| Specimen group | Specimen | SCC test method | Sustained test stress (ksi) | Test duration (days) | Inspection results |
|---|---|---|---|---|---|
| AF1 | 1 | Tensile | 23.55 | n/a | Failed during pre-loading |
| | 2 | | (75% weld YS) | 30 | Acceptable disposition |
| | 3 | | | 30 | Acceptable disposition |
| | 4 | | 15.7 | n/a | Failed during pre-loading |
| | 5 | | (50% weld YS) | 30 | Acceptable disposition |
| | 6 | | | 30 | Acceptable disposition |
| | 7 | | 7.85 | 30 | Acceptable disposition |
| | | | (25% weld YS) | | |
| | 8 | | 0 | 30 | Acceptable disposition |
| | 9 | Four-point | 23.55 | 30 | Acceptable disposition |
| | 10 | bend | (75% weld YS) | 30 | Acceptable disposition |
| | 11 | | | 30 | Acceptable disposition |
| | 12 | | 15.7 | 30 | Acceptable disposition |
| | 13 | | (50% weld YS) | 30 | Acceptable disposition |
| | 14 | | | 30 | Acceptable disposition |
| | 15 | | 7.85 | 30 | Acceptable disposition |
| | | | (25% weld YS) | | |
| | 16 | | 0 | 30 | Acceptable disposition |
| AF2 | 1 | Tensile | 27.3 | 30 | Acceptable disposition |
| | 2 | | (75% weld YS) | 30 | Acceptable disposition |
| | 3 | | | 30 | Acceptable disposition |
| | 4 | | 18.2 | 30 | Acceptable disposition |
| | 5 | | (50% weld YS) | 30 | Acceptable disposition |
| | 6 | | | 30 | Acceptable disposition |
| | 7 | | 9.1 | 30 | Acceptable disposition |
| | | | (25% weld YS) | | |
| | 8 | | 0 | 30 | Acceptable disposition |
| | 9 | | | 30 | Acceptable disposition |
| | 10 | Four-point | 27.3 | 30 | Acceptable disposition |
| | 11 | bend | (75% weld YS) | 30 | Acceptable disposition |
| | 12 | | 18.2 | 30 | Acceptable disposition |
| | 13 | | (50% weld YS) | 30 | Acceptable disposition |
| | 14 | | | 30 | Acceptable disposition |
| | 15 | | 9.1 | 30 | Acceptable disposition |
| | | | (25% weld YS) | | |
| | 16 | | 0 | 30 | Acceptable disposition |

As shown in Tables 3 and 4, generally acceptable test results were achieved. In addition, an unexpected property of the present invention was also realized. Specifically, multiple welding passes can improve, rather than degrade, the tensile strength of the weldment. This property is unexpected because welding two items together with multiple passes, or on more than one occasion, by other welding techniques such as fusion welding typically exposes the weldment to additional heat and makes the weldment more susceptible to SCC and/or decreases the strength of the weldment. Unlike with prior art techniques, therefore, embodiments of the present disclosure allow a single-pass weldment to be reinforced or repaired by applying additional welding passes at a later point in time, including, by way of non-limiting example, at least about two weeks later, and preferably multiple weeks, months, or years later.

Figure 3:
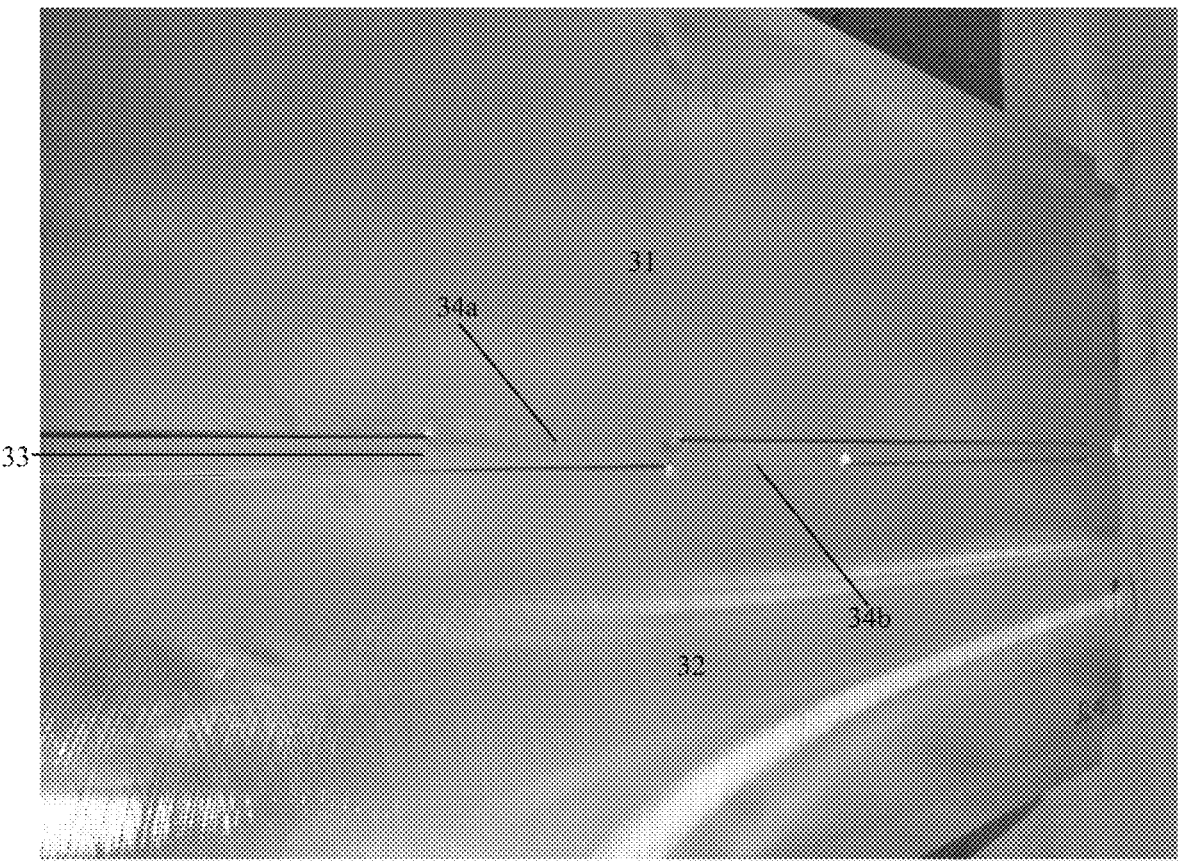
FIG. 3 is an illustration of an arrangement of two aluminum 7xxx alloy plates, an aluminum 2xxx alloy filler insert, and fusion tack welds used to hold the filler insert in place between the plates before a friction stir welding step, according to embodiments of the present invention.

Referring now to FIG. 3, two plates 31,32 of aluminum 7075-T7351 alloy and the filler insert 33 of aluminum 2219 alloy are shown prior to friction stir welding. The filler insert 33 was tack-welded to the two plates 31,32 by manual gas tungsten arc welding along tack segments 34a,b to hold the plates 31,32 and filler insert 33 in place during friction stir welding. The arrangement illustrated in FIG. 3 corresponds to specimen group AF1 of Table 4.

Figure 4:
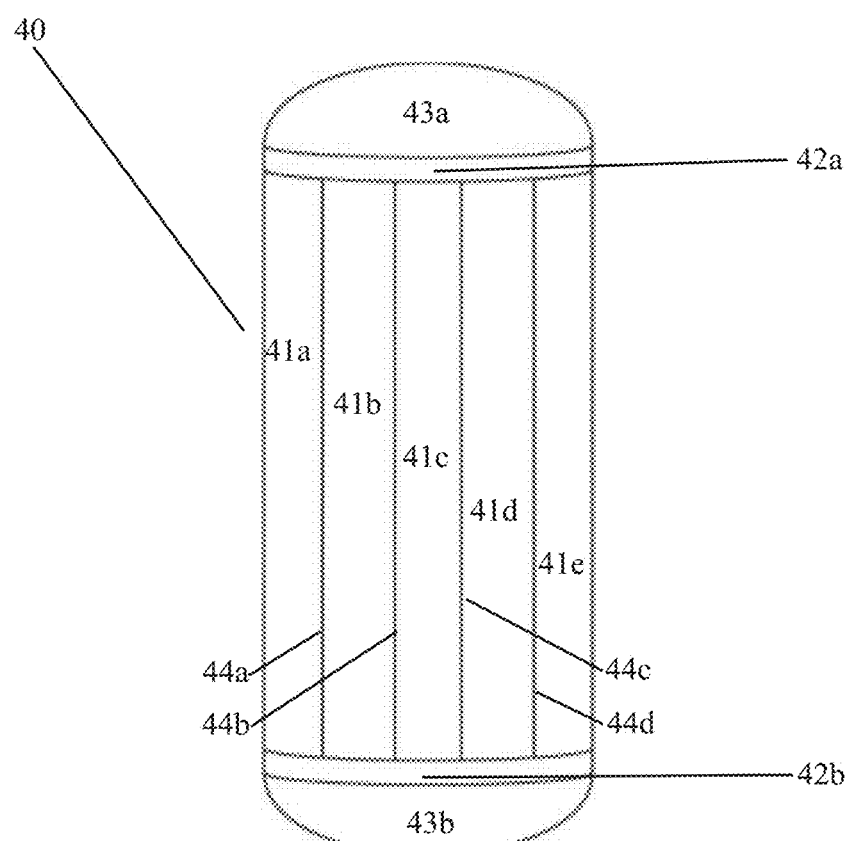
FIG. 4 is an illustration of a spacecraft propellant tank constructed by a friction stir welding process, according to embodiments of the present invention.

Referring now to FIG. 4, a spacecraft propellant tank 40 constructed according to methods of the present invention is illustrated. The tank 40 comprises wall panels 41a,b,c,d,e, rings 42a,b, and domes 43a,b. The wall panels 41a,b,c,d,e are made primarily of aluminum 7xxx alloy, and are joined by inserting between each panel 41 a narrow filler strip of aluminum 2xxx alloy and friction stir welding along each seam, e.g., weld regions 44 a,b,c,d as shown in FIG. 4. In making a cylinder, there may be more panels and/or weld regions than are illustrated. The weld regions 44 a,b,c,d encompass the entire width of the filler strip and the edge of each of the wall panels 41. The rings 42a,b and domes 43a,b may then be joined to each other and/or to the wall panels 41 by a similar friction stir welding process using filler strips of aluminum 2xxx alloy. The tank 40 thus constructed retains the advantageous physical properties of the aluminum 7xxx alloy parent material, but is superior to tanks made of components joined by other methods in that the weldments have improved resistance to SCC and do not require costly and difficult PWAA.

Example 3

Aging of Welds of Aluminum 7075-T7351 Plates with Aluminum 2219-T87 Filler

To test whether the SCC resistance of welds of the present invention persists as the welds age, two aluminum 7075-T7351 alloy plates were friction stir welded with an aluminum 2219-T87 alloy filler insert according to the weld schedule of Example 2, heat treated at 250° F. for 24 hours and allowed to air-cool (to simulate and accelerate aging) approximately three weeks after welding, and then allowed to age at room temperature for approximately four months. At the conclusion of the aging period, specimens were prepared and subjected to 30 days of SCC testing according to ASTM G47. Tensile strength testing was carried out both before and after the aging period. Half of the specimens in the SCC test (AF3) were subjected to only a single pass of the friction stir welding tool, while the other half (AF4) were subjected to four passes with offset passes 0.150 inches from the weld centerline. For all specimens, surface conductivity and hardness were measured at the weld centerline, the bending stress direction in SCC testing was transverse across the weldment, and the SCC test was carried out in a 3.5% sodium chloride solution utilizing the alternate immersion process. Results of the tensile strength and SCC testing are presented in Tables 5 and 6, respectively. In Table 6, "UTS" refers to ultimate tensile strength, "YS" refers to yield strength, and "% e" refers to elongation in percent.

TABLE 5

Pre-aging tensile strength test results

| Specimen group | Conductivity (% IACS) | Hardness (HRB) | Ultimate tensile strength (ksi) | Yield strength (ksi) | Elongation (%) |
|---|---|---|---|---|---|
| AF3 (16 test samples) | 34.3 | 69 | 49.9 | 44.3 | 4.5 |
| AF4 (16 test samples) | 34.6 | 68 | 56.7 | 40.8 | 5.7 |

TABLE 6

Post-aging SCC and tensile strength test results

| Specimen group | Specimen | SCC test method | Sustained test stress (ksi) | Test duration (days) | Inspection results |
|---|---|---|---|---|---|
| AF3 | 1 | Tensile | 33.225 (75% weld YS) | 30 | Specimen broke during removal from stressing frame |
| | 2 | | | 30 | 39.9 ksi UTS, 37.9 ksi YS, 3.9 %e |
| | 3 | | | 30 | Specimen broke during removal from stressing frame |
| | 4 | | 22.15 (50% weld YS) | 30 | 40.7 ksi UTS, 33.8 ksi YS, 4.0 %e |
| | 5 | | | 30 | 40.9 ksi UTS, 35.6 ksi YS, 4.1 %e |
| | 6 | | | 30 | 50.7 ksi UTS, 37.8 ksi YS, 4.7 %e |
| | 7 | | 11.075 (25% weld YS) | 30 | Specimen broke during removal from stressing frame |
| | 8 | | 0 | 30 | 42.6 ksi UTS, 34.8 ksi YS, 2.7 %e |
| | 9 | Four-point bend | 33.225 (75% weld YS) | 30 | 49.8 ksi UTS, 36.7 ksi YS, 3.0 %e |
| | 10 | | | 30 | 55.1 ksi UTS, 39.6 ksi YS, 4.0 %e |
| | 11 | | | 30 | 55.6 ksi UTS, 45.4 ksi YS, 5.0 %e |
| | 12 | | 22.15 (50% weld YS) | 30 | 50.4 ksi UTS, 39.0 ksi YS, 3.5 %e |
| | 13 | | | 30 | 37.5 ksi UTS, 3.5 %e Ruptured before YS obtained |
| | 14 | | | 30 | 53.6 ksi UTS, 43.1 ksi YS, 2.5 %e |
| | 15 | | 11.075 (25% weld YS) | 30 | 52.4 ksi UTS, 40.6 ksi YS, 5.5 %e |
| | 16 | | 0 | 30 | 24.5 ksi UTS, 24.4 ksi YS, 1.0 %e |
| AF4 | 1 | Tensile | 30.6 (75% weld YS) | 30 | Specimen broke during removal from stressing frame |
| | 2 | | | 30 | Specimen broke during removal from stressing frame |
| | 3 | | | 30 | 45.8 ksi UTS, 33.0 ksi YS, 4.0 %e |
| | 4 | | 20.4 (50% weld YS) | 30 | 41.7 ksi UTS, 32.5 ksi YS, 3.3 %e |
| | 5 | | | 30 | 50.2 ksi UTS, 36.5 ksi YS, 5.0 %e |
| | 6 | | | 30 | 41.3 ksi UTS, 37.8 ksi YS, 11 %e |
| | 7 | | 10.2 (25% weld YS) | 30 | 43.4 ksi UTS, 29.2 ksi YS, 4.3 %e |
| | 8 | | 0 | 30 | 45.9 ksi UTS, 31.0 ksi YS, 5.0 %e |
| | 9 | Four-point bend | 30.6 (75% weld YS) | 30 | 50.5 ksi UTS, 38.8 ksi YS, 3.0 %e |
| | 10 | | | 30 | 56.8 ksi UTS, 36.9 ksi YS, 6.5 %e |
| | 11 | | | 30 | 51.4 ksi UTS, 44.1 ksi YS, 3.5 %e |
| | 12 | | 20.4 (50% weld YS) | 30 | 54.8 ksi UTS, 38.4 ksi YS, 3.0 %e |
| | 13 | | | 30 | 54.6 ksi UTS, 38.6 ksi YS, 5.0 %e |
| | 14 | | | 30 | 55.9 ksi UTS, 43.4 ksi YS, 5.0 %e |
| | 15 | | 10.2 (25% weld YS) | 30 | 53.6 ksi UTS, 37.1 ksi YS, 3.0 %e |
| | 16 | | 0 | 30 | 50.3 ksi UTS, 42.0 ksi YS, 3.0 %e |

As shown in Tables 5 and 6, generally acceptable test results were achieved. The results indicate that the friction stir weld process of the present invention can produce components that, in as-welded condition, are viable for long-term structures with a useful life of several years, e.g.

long-term aluminum structures and components therefor, without the need for any post-weld artificial aging treatments to improve SCC resistance.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Other modifications or uses for the present invention will also occur to those of skill in the art after reading the present disclosure. Such modifications or uses are deemed to be within the scope of the present invention.

What is claimed is:

1. A method for constructing a spacecraft propellant tank, comprising:
   providing N wall panels, where N is an integer equal to or greater than one, each of the N wall panels comprising an aluminum 7xxx alloy;
   providing N wall panel filler inserts, each of the N wall panel filler inserts comprising an aluminum 2xxx alloy;
   disposing each of the N wall panel filler inserts between, and in direct physical contact with, panel weld edges of consecutive ones of the N wall panels or, when N equals 1, a first panel weld edge and a second panel weld edge of the wall panel;
   friction stir welding along each of N wall panel weld regions, each of the N wall panel weld regions comprising the entirety of a width of one of the N wall panel filler inserts and either the panel weld edges of consecutive ones of the N wall panels or, when N equals 1, the first and second panel weld edges of the wall panel, to form a cylinder;
   providing first and second domes, each of the first and second domes comprising an aluminum 7xxx alloy;
   providing first and second dome filler inserts, each of the first and second dome filler inserts comprising an aluminum 2xxx alloy;
   disposing each of the first and second dome filler inserts at opposing ends of the cylinder, wherein the first dome filler insert is in direct physical contact with a first dome weld edge of the cylinder and a weld edge of the first dome to form a first dome weld region, and wherein the second dome filler insert is in direct physical contact with a second dome weld edge of the cylinder and a weld edge of the second dome to form a second dome weld region; and
   friction stir welding along each of the first and second dome weld regions to form the spacecraft propellant tank.

2. The method of claim 1, further comprising:
   providing a ring comprising an aluminum 7xxx alloy; and
   between the disposing step of claim 1 and the friction stir welding step of claim 1:
      providing a ring filler insert comprising an aluminum 2xxx alloy;
      disposing the ring filler insert at an end of the cylinder, wherein the ring filler insert is in direct physical contact with a cylinder weld edge of the ring and ring weld edges of all of the N wall panels to form a ring weld region; and
      friction stir welding along the ring weld region.

3. The method of claim 1, wherein at least one of the aluminum 7xxx alloys is aluminum 7075 alloy.

4. The method of claim 1, wherein at least one of the aluminum 2xxx alloys is aluminum 2219 alloy.

5. The method of claim 1, wherein at least one of the filler inserts is a linear sheet or strip.

6. The method of claim 1, wherein at least one of the friction stir welding steps consists essentially of a single pass with a friction stir welding tool.

7. The method of claim 1, wherein at least one of the friction stir welding steps comprises at least two passes with a friction stir welding tool.

8. The method of claim 7, wherein a time interval between the first pass and the second pass is at least two weeks.

9. A method for constructing a spacecraft propellant tank, comprising:
   providing N wall panels, where N is an integer equal to or greater than one, each of the N wall panels comprising an aluminum 7xxx alloy;
   providing N wall panel filler inserts, each of the N wall panel filler inserts comprising an aluminum 2xxx alloy;
   disposing each of the N wall panel filler inserts between panel weld edges of consecutive ones of the N wall panels or, when N equals 1, a first panel weld edge and a second panel weld edge of the wall panel;
   friction stir welding along each of N wall panel weld regions, each of the N wall panel weld regions comprising the entirety of a width of one of the N wall panel filler inserts and either the panel weld edges of consecutive ones of the N wall panels or, when N equals 1, the first and second panel weld edges of the wall panel, to form a cylinder;
   providing first and second domes, each of the first and second domes comprising an aluminum 7xxx alloy;
   providing first and second dome filler inserts, each of the first and second dome filler inserts comprising an aluminum 2xxx alloy;
   disposing each of the first and second dome filler inserts at opposing ends of the cylinder, wherein the first dome filler insert, a first dome weld edge of the cylinder, and a weld edge of the first dome form a first dome weld region, and wherein the second dome filler insert, a second dome weld edge of the cylinder, and a weld edge of the second dome form a second dome weld region; and
   friction stir welding along each of the first and second dome weld regions to form the spacecraft propellant tank.

10. The method of claim 9, further comprising:
    providing a ring comprising an aluminum 7xxx alloy; and
    between the disposing step of claim 9 and the friction stir welding step of claim 9:
       providing a ring filler insert comprising an aluminum 2xxx alloy;
       disposing the ring filler insert at an end of the cylinder, wherein the ring filler insert, a cylinder weld edge of the ring, and ring weld edges of all of the N wall panels form a ring weld region; and
       friction stir welding along the ring weld region.

11. The method of claim 9, wherein at least one of the aluminum 7xxx alloys is aluminum 7075 alloy.

12. The method of claim 9, wherein at least one of the aluminum 2xxx alloys is aluminum 2219 alloy.

13. The method of claim 9, wherein at least one of the filler inserts is a linear sheet or strip.

14. The method of claim 9, wherein at least one of the friction stir welding steps consists essentially of a single pass with a friction stir welding tool.

15. The method of claim 9, wherein at least one of the friction stir welding steps comprises at least two passes with a friction stir welding tool.

16. The method of claim 15, wherein a time interval between the first pass and the second pass is at least two weeks.

\* \* \* \* \*